United States Patent [19]
Fenn

[11] 4,026,256
[45] May 31, 1977

[54] ENGINE EXHAUST GAS RECIRCULATION (EGR) CONTROL SYSTEM

[75] Inventor: Gordon William Fenn, Mount Clemens, Mich.

[73] Assignee: Chrysler Corporation, Highland Park, Mich.

[22] Filed: May 10, 1976

[21] Appl. No.: 685,012

[52] U.S. Cl. .................. 123/119 A; 123/119 EC
[51] Int. Cl.$^2$ ........................... F02M 25/06
[58] Field of Search ............... 123/119 A, 119 EC

[56] References Cited

UNITED STATES PATENTS

| | | | |
|---|---|---|---|
| 2,995,124 | 8/1961 | Wutrich | 123/119 A |
| 3,646,764 | 3/1972 | Nakajima et al. | 123/119 A |
| 3,788,284 | 1/1974 | Gardner | 123/119 A |
| 3,799,133 | 3/1974 | Frank | 123/119 A |
| 3,807,376 | 4/1974 | Glockler et al. | 123/119 A |
| 3,872,846 | 3/1975 | Taplin et al. | 123/119 A |
| 3,915,134 | 10/1975 | Young et al. | 123/119 A |
| 3,969,614 | 7/1976 | Moyer et al. | 123/119 A |
| 3,977,373 | 8/1976 | Sand | 123/119 A |
| 3,982,395 | 9/1976 | Hasegawa et al. | 123/119 A |

FOREIGN PATENTS OR APPLICATIONS

| 2,449,954 | 4/1975 | Germany | 123/119 A |
|---|---|---|---|

*Primary Examiner*—Wendell E. Burns
*Attorney, Agent, or Firm*—Talburtt & Baldwin

[57] ABSTRACT

A novel exhaust gas recirculation (EGR) control system comprises an EGR valve having an inlet control port connected through a normally closed solenoid-actuated valve to venturi vacuum tap of the caburetor. The solenoid-actuated valve is controllably energized via an electrical control circuit which monitors a number of engine operational characteristics. In the preferred embodiment, these monitored characteristics include: the amount of throttle blade opening; the magnitude of intake manifold vacuum; the relative durations of idle and non-idle operation during a immediately past time period; and the engine temperature. Individual electrical control signals are derived for each of the monitored characteristics and the value of each signal indicates whether the correspondingoperating characteristic is commanding the solenoid-actuated valve to be energized. The control circuit is so constructed that the solenoid-actuated valve is open, thereby permitting the EGR valve to be actuated, only if all the individual control signals are simultaneously commanding exhaust gas recirculation.

15 Claims, 3 Drawing Figures

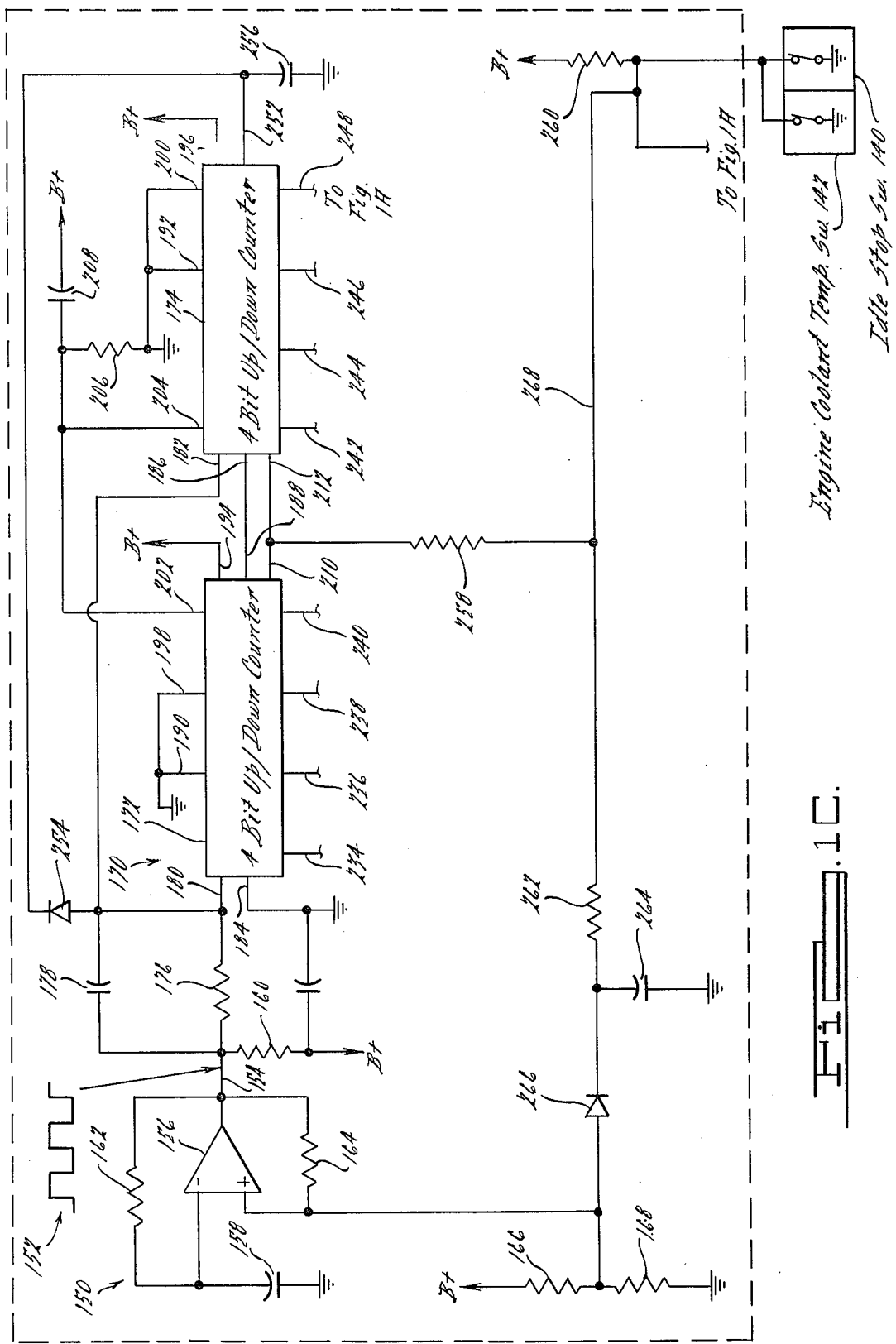

ENGINE EXHAUST GAS RECIRCULATION (EGR) CONTROL SYSTEM

BACKGROUND AND SUMMARY OF THE INVENTION

This invention pertains to exhaust gas recirculation (EGR) systems for internal combustion engines in automotive vehicles and particularly concerns a novel control system for exhaust gas recirculation.

EGR systems are currently utilized in many automobile engines for the purpose of reducing the amount of oxides of nitrogen in the engine exhaust. Basically, this is accomplished by allowing a controlled amount of hot exhaust as to recirculate and dilute the incoming fuel and air mixture. Typically, the EGR valve is a vacuum-actuated, poppet-type unit used to modulate exhaust gas flow from the exhaust gas crossover into the incoming air-fuel mixture. A common criticism of EGR systems in autmomobie engines is that driveability of the automobile is impaired under certan conditions and that fuel economy is significantly downgraded. Also, EGR systems are often complicated requiring extra components which add to the cost of the system and the complexity of the engine compartment. For example, where a high rate spring is used in the EGR valve it becomes necessary to use a vacuum amplifier unit for delivering the necessary amount of vacuum to overcome the high spring rate when the EGR valve is modulated.

The present invention is directed to a novel EGR conrol system which in certain respects reduces the amount of complexity otherwise required. According to the invention, a plurality of individual engine operational characteristics are monitored and utilized in determining when engine exhaust gas is to be recirculated. Broadly, in one aspect, the invention may be considered as providing an on-off (or "bang-bang ") type of EGR system because the individual control signals developed from the monitored engine operational characteristics are utilized to either open or close a valve which is connected in a vacuum line between carburetor venturi vacuum tap and an EGR valve. In another aspect, the invention provides that the individual control signals are utilized in controlling exhaust gas recirculation such that all the control signals must be commanding exhaust gas recirculation for any exhaust gas recirculation to occur. Stated conversely, the control is such that if any one of the control signals is commandng no exhaust gas recirculation, then that signal overrides any other signal to the contrary so that no exhaust gas circulation occurs at all. A further aspect of the invention relates to the specific monitored engine operational characteristis which are utilized in controlling exhaust gas recirculation.

In a preferred embodiment of the present invention as hereinafter disclosed, a normaly closed, solenoid-actuated valve is disposed in a vacuum line connecting carburetor venturi vaccum to an inlet control port of an EGR valve. Energization of the solenoid-actuated valve is controlled via an electrical control circuit which monitors a plurality of engine operational characteristics. These operational characteristics are: the amount of throttle blade opening; the magnitude of intake manifold vacuum; the relative durations of engine idle and non-ilde operation duirng an immediately past time period; and the engine temperature. The electrical control circuit is so designed that all monitored characteristics must be commanding exhaust gas recirculation for the solenoid-actuated valve to be open. Thus, with this arrangement the EGR valve can be modulated by carburetor venturi vacuum only under a selected set of operating conditions; exhaust gas recirculation is terminated if any one or more of the monitored characteristics dictates that no exhaust gas is to be circulated, whereby that characteristic effectively overrides any others which are to the contrary. From this description, it will be appreciated that in accordance with the invention, an engine powered automotive vehicle has a portion of its exhaust gas recirculated; in a controlled on-off fashion by selected engine operating conditions. Satisfactory driveability, fuel economy, and compliance with emission target levels can be obtained with a lesser degree of complexity than in prior systems.

The foregoing features, advantages and benefits of the present inventor will be seen in the ensuing description and claims which are to be considered in conjunction with the accompanying drawings.

BRIEF DESCRIPTION OF THE DRAWINGS

The drawings illustrate a presently preferred embodiment of the present invention according to the best mode presently contemplated in carrying out the invention.

FIGS. 1A, 1B, and 1C should be considered together and constitute a schematic diagram of an exhaust gas recirculation control system embodying principles of the present invention.

DESCRIPTION OF THE PREFERRED EMBODIMENT

Figure 1A:
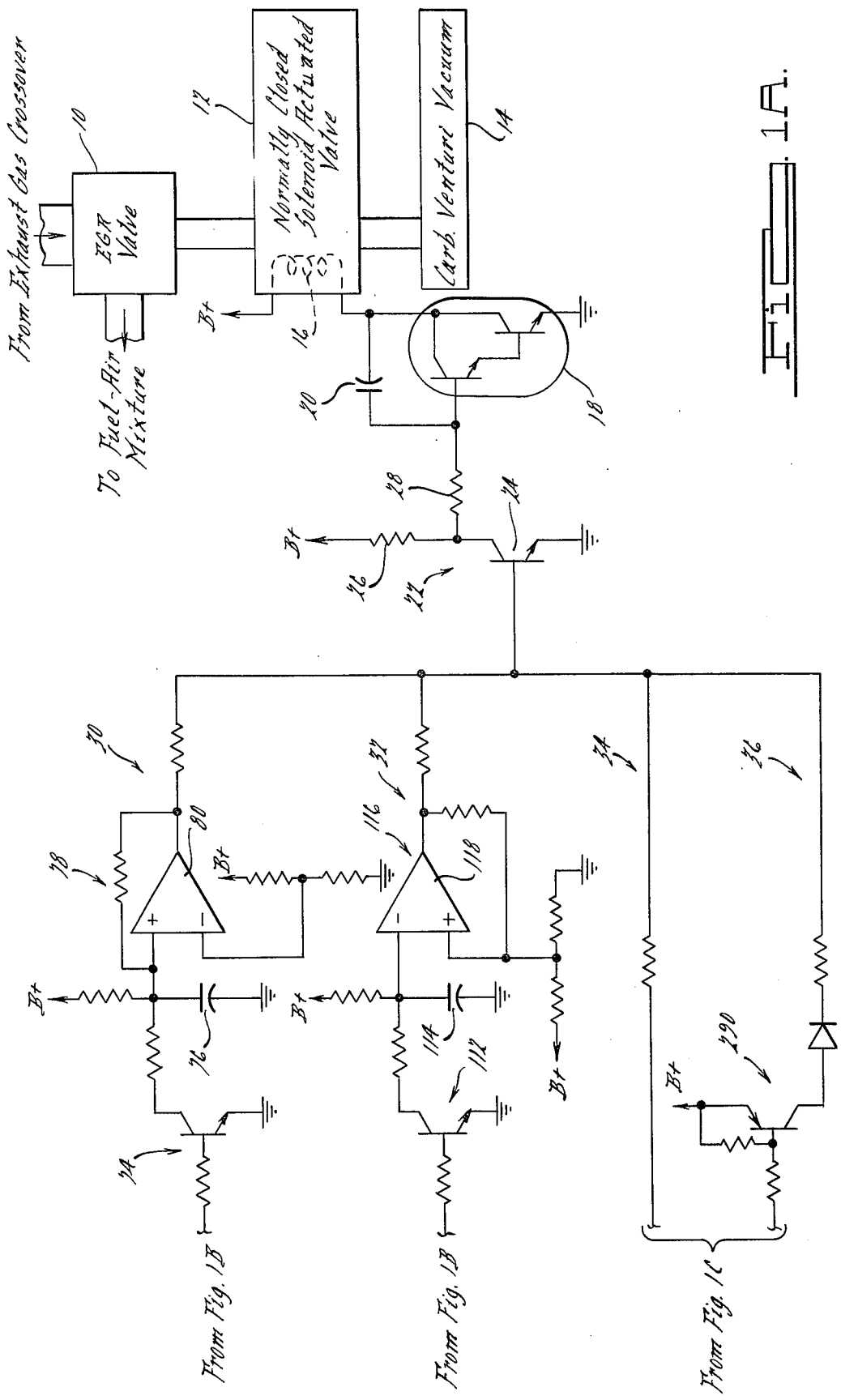

In FIG. 1A, an EGR valve 10 has an inlet control port connected through a normally closed, solenoid-actuated valve 12 to a vacuum tap 14 on the carburetor which supplies venturi vacuum. EGR valve 10 is a generally conventional vacuum actuated, poppet type unit used to control exhaust gas flow from the exhaust gas crossover into the incoming air-fuel mixture. Generally, valve 10 increasingly opens as the magnitude of vacuum appllied to its inlet control port increases. Valve 12 is of generally conventional design and comprises an electrically energizable coil 16 which controls the opening and closing of the valve. When coil 16 is not energized the valve is closed; when coil 16 is energized, the valve opens to permit venturi vacuum to be delivered to the inlet control port of EGR valve 10. Accordingly, the overall operation of this portion of the system is such that when coil 16 is not energized there is no exhaust gas is recirculated in an amount determined by carburetor venturi vacuum. Although venturi vacuum is used in the illustrated system, ported vacuum is an alternative with a ported vacuum tap being exposed to an increasing percentage of manifold vacuum as the throttle blade opens. By providing EGR valve 10 with a comparatively low rate spring, the venturi vacuum tap itself provides enough vacuum force to actuate valve 10 without the necessity of a vacuum amplifier. Therefore, the invention serves to reduce the complexity and amount of hardware required in an EGR system.

For controlling the energization of coil 16, the invention monitors a number of engine operational characteristics and in accordance therewith controllably energizes coil 16. Implementation of this control system is via electrical control circuitry shown in the remainder of FIGS. 1A and in FIGS. 1B and 1C. In FIG. 1A, coil 16 is coupled via a Darlington type transistor 18 across a regulated power supply having a positive polarity B+ terminal and a negative polarity ground terminal. The regulated power supply is provided via a conventional electronic regulator which may be energized from the vehicle battery to supply an appropriate potential for the electrical control circuit. Because of the inductive nature of coil 16, a spike suppressing capacitor 20 is connected in circuit as illustrated. A drive stage 22 for driving transistor 18, comprises an NPN transistor 24 and a pair of resistors 26 and 28 connected as illustrated. The operation of this much of the electrical control circuit is such that when base current is caused to flow in the transistor 24, transistor 18 is nonconductive, and hence coil 16 is not energized, and when base current flow in transistor 24 terminates, transistor 18 conducts to thereby energize coil 16.

Base current flow in transistor 24 is controlled via four input circuits designated generally 30, 32, 34 and 36. Each of these circuits 30, 32, 34 and 36 monitors a corresponding engine operating characteristic: circuit 30, throttle blade position; circuit 32, intake manifold vacuum; circuit 34, the relative durations of idle and non-idle operation during an immediately past time interval; and circuit 36, the engine temperature as measured by engine coolant temperature. Each of the circuits 30, 32, 34 and 36 is individually capable of causing a sufficient amount of base current in transistor 24 so that the latter is conducting. Accordingly, so long as any one of the four circuits 30, 32, 34 and 36 is supplying base current for transistor 24, coil 16 remains de-energized so that both valves 12 and 10 remain closed. Under this condition there is no exhaust gas recirculation. Only when none of the four circuits 30, 32, 34 and 36 is supplying base current drive to transistor 24 is valve 12 open to permit carburetor venturi vacuum to be supplied to EGR valve 10. In overall effect then, any one of the four circuits 30, 32, 34 and 36 will, under the appropriate condition of the corresponding monitored engine operational characteristic, cancel exhaust gas recirculation even though one or more of the other control circuits is commanding exhaust gas circulation. The four individual circuits 30, 32, 34 and 36 can now be each considered in detail.

Figure 1B:
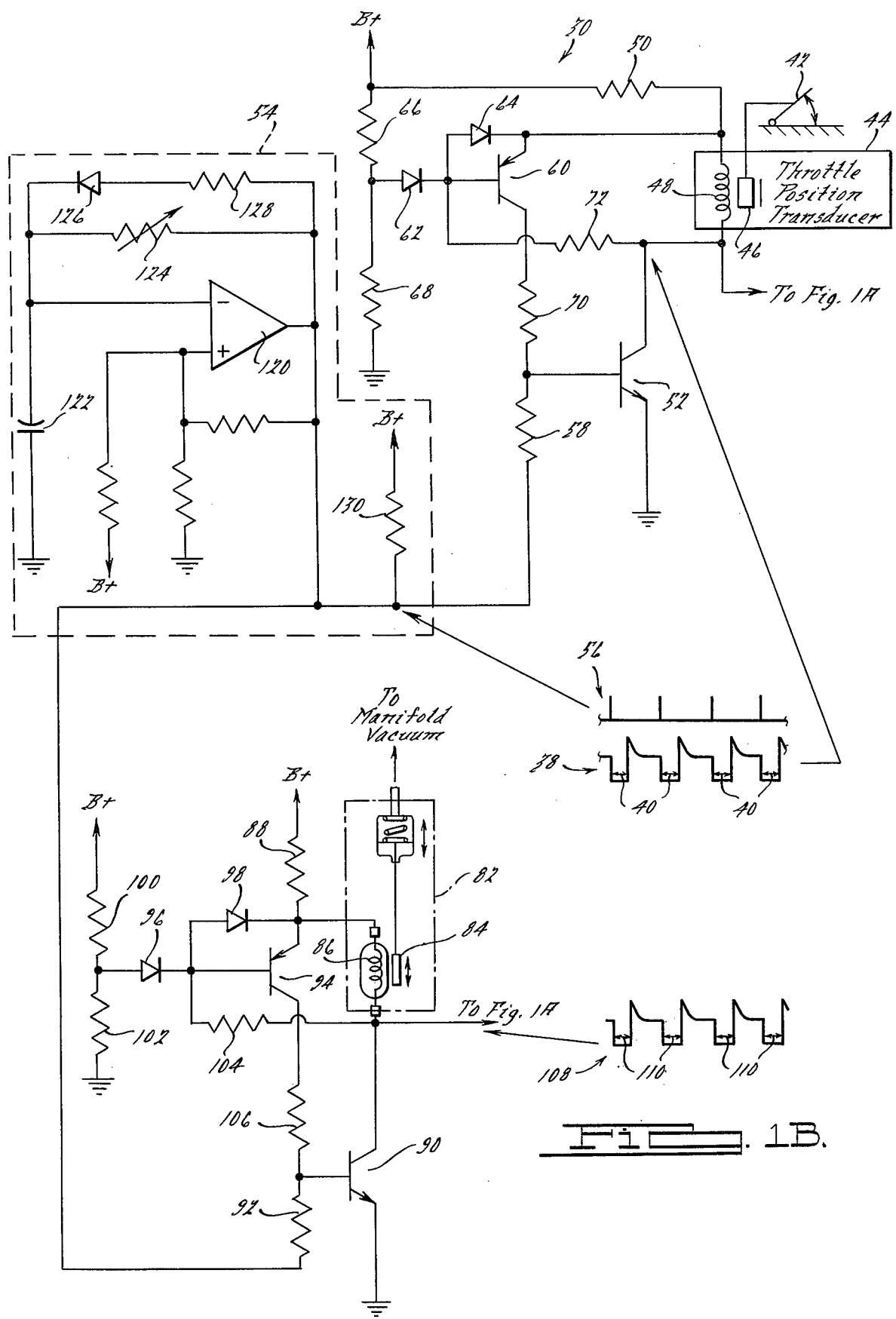

Circuit 30 is shown in its entirety in FIGS. 1B and 1A. Briefly, that portion of circuit 30 shown in FIG. 1B develops a repetitive pulse waveform, illustratively shown at 38 wherein the pulse widths 40 are a function of the position of the carburetor throttle blade 42. In order to monitor throttle blade position, a variable inductance throttle position transducer 44 has a movable ferrite core 46 operatively coupled via an appropriate connecting means with the throttle blade 42. The inductive coil 48 of transducer 44 is electrically connected in circuit to provide a variable inductance which is a function of the position of ferrite core 46 and hence of the position of throttle blade 42. By selectively positioning core 46 relative to coil 48 the inductance of coil 48 is made to change in accordance with changes in throttle position, and in the present system the inductance is caused to decrease as the throttle blade increasingly opens. Coil 48 is in turn electrically connected as illustrated in series circuit with a resistor 50 and the collector-emitter circuit of main control transistor 52 across the B+ power supply. Coil 48 and resistor 50 define an L/R time constant, the value of which decreases as the throttle blade increasingly opens.

A pulse generator circuit 54 supplies a waveform 56 composed of very narrow triggering pulses at a predetermined frequency. Pulses from pulse generator 54 are coupled through a resistor 58 to the base of a transistor 52. In this way transistor 52 is switched from a condition of nonconduction into a condition of full conduction during each of the very short triggering pulses of waveform 56. The switching of transistor 52 form a condition of nonconduction to a condition of full conduction will cause the circuit to experience an exponential current transient whereby coil 48 is charged. When this switching occurs, essentially the full regulated power supply voltage is immediately impressed across coil 48 with the terminal thereof which is common to the collector of transistor 52 experiencing a sudden voltage drop. Wave form 38 illustrates the collector voltage. A feedback circuit is operatively associated with transistor 52 to detect the initiation of the transient and to maintain transistor 52 in full conduction after the pulse of waveform 56 which initiated the transient has terminated. This feedback circuit includes a PNP transistor 60, a pair of diodes 62 and 64, and a plurality of four resistors 66, 68, 70 and 72 which are connected in circuit as illustrated in the drawings. With the illustrated connection of its base-emitter circuit, transistor 69 is switched from a condition of nonconduction into a condition of full conduction in response to the initial value of the transient voltage impressed across coil 48. With transistor 60 in full conduction, current is drawn from the B+ power suply through resistor 50, through the emitter-collector of transistor 60, through resistor 70 to the base of transistor 52 thereby providing adequate base current for this latter transistor so as to maintain the same in conduction after the triggering pulse of waveform 56 terminates. Since transistor 52 is thus maintained in full conduction, the transient continues as an increasing current flow from the regulated power supply through resistor 50, through coil 48, and the collector-emitter circuit of transistor 52. The current magnitude increases along a decreasng exponential curve heading toward a final steady state magnitude. The connection of resistors 66 and 68 provides a divided voltage supplied through diode 62 as a reference to the base of transistor 60. This arrangement defined a voltage clamp which clamps the voltage at the base of transistor 60 to a minimum potential should the voltage otherwise tend to be driven less than this minimum. When transistor 60 is switched into conduction, the voltage clamp establishes a reference potential against which the transient voltage at the collector of transistor 60 is compared. When the potential at the junction of coil 48 and resistor 50 (i.e., the collector voltage of transistor 60) passes through this reference potential, transistor 60 is suddenly switched from full conduction to non-conduction because the circuit parameters are selected such that the width of each pulse of wave form 56 is just long enough to permit the feedback circuit to gain control of transistor 52 but short enough that it has terminated when transistor 60 is switched back to nonconduction. The switching of transistor 60 into nonconduction thereby terminates base current flow into transistor 52 so that this latter transistor also switches into nonconduction. Immediately the L/R current transient is terminated and the energy in coil 48 is dissipated via resistor 72 and diode 64. In this way the pulse width 40 of each pulse in waveform 38 is in inverse proportion to the amount of throttle opening.

Waveform 38 is supplied to the portion of circuit 30 shown in FIG. 1A. This portion of circuit 30 comprises an inverter 74, an averaging capacitor 74, an averaging capacitor 76 and a comparator switching stage 78. Inverter 75 is nonconductive concurrent with each pulse width 40. The averaging capacitor 76 monitors the conductivity of inverter 74 to provide a DC signal representative of the magnitude of the average value of the pulse widths 40. This DC signal is applied as an input to switching stage 78. Switching stage 78 comprises a comparator 80 having a pair of inputs and an output. The non-inverting input of comparator 80 receives the average signal from capacitor 76 while a fixed reference signal is applied to the inverting input of the comparator. So long as the average signal received by the comparator from capacitor 76 exceeds the reference, the output of the comparator provides base current drive to transistor 24. When the signal from capacitor 76 drops below the reference, the comparator output no longer supplies base current drive to transistor 24. The reference is selected such that base current for transistor 24 is provided at idle and for small amounts of throttle opening from idle, while at greater throttle openings, base current is not supplied. Thus, circuit 30 operates such that as the throttle blade nears idle from a more open position, exhaust gas recirculation is terminated.

Circuit 32 is almost identical to circuit 30 and, therefore, will not be described in detail. A vacuum transducer 82 has an inlet port connected to engine manifold vacuum. A ferrite core 84 is selectively positioned relative to an inductive coil 86 in accordance with the intensity of manifold vacuum. Coil 86 forms, in cooperation with a resistor 88, an RL circuit which is subjected periodically to an electrical transient via a control transistor 90. Triggering pulses from pulse generator 54 are coupled through a resistor 92 to the base of transistor 90. The feedback network is composed of a transistor 94, a pair of diodes 96, 98 and four resistors 100, 102, 104, 106. A waveform 108 is developed at the collector of transistor 90 and has pulse widths 110 which are a function of the L/R time constant and hence are representative of the amount of intake manifold vacuum, specifically the pulse widths becoming narower as the amount of vacuum increases. The waveform 108 is supplied to an inverter 112, an averaging capacitor 114 and a comparator switching stage 116. Circuits 112, 114 and 116 correspond to circuits 74, 76 and 78, except that averaging capacitor 116 connects to the inverting input of comparator 118 while a reference potential is supplied to the non-inverting comparator input.

So long as intake manifold vacuum exceeds a predetermined level, comparator 118 supplies base current for transistor 24. When the intensity of manifold vacuum falls below this level, the comparator ceases base current to transistor 24. Thus, with circuit 32, exhaust gas recirculation is prevented when intake manifold vacuum rises above a predetermined level, (i.e., generally light or moderate loads).

Briefly, pulse generator 54 comprises a comparator 120 to whose non-inverting input a fixed potential is supplied. A capacitor 122 is connected to the inverting input. Feedback from the comparator output to the capacitor is provided via two parallel circuits one of which comprises a single resistor 124 and the other of which comprises a diode 126 and a resistor 128. Initially capacitor 122 is uncharged and begins charging from the B+ supply through a resistor 130 and through the two parallel feedback circuits. By selecting the component values such that resistors 128 and 130 are small in comparison to resistor 124, the charging time constant is determined principally by resistors 128 and 130. When a certain charge is reached on capacitor 122, the output of comparator 120 switches to provide a low impedance to ground. When this happens, capacitor 122 discharges through resistor 124. Because resistor 124 is large in comparison to resistor 128, the discharge time constant is vastly larger than the charge time constant. In this way, waveform 56 is developed with very narrow pulse widths. However, the frequency of the pulses is maintained substantially constant.

Circuit 34 includes a rectangular wave generator circuit 150 which generates a rectangular wave signal 152 appearing at line 154. Rectangular wave generator 150 comprises a voltage type comparator 156, a capacitor 58, and a plurality of five resistors 160, 162, 164, 166 and 168. Resistors 166 and 168 are connected across the B+ supply and form a voltage divider supplying a fraction of the B+ supply voltage to the non-inverting input terminal of comparator 156. The output of comparator 156 is connected to resistor 160 which functions as a pull-up resistor to the positive terminal of the B+ supply. Resistor 162 connects from the comparator output terminal to the inverting input terminal of the comparator while resistor 164 connects from the output terminal to the non-inverting input terminal of the comparator. Capacitor 158 connects between the inverting input terminal of comparator 156 and ground. Rectangular wave generator 150 operates in the following fashion. Assuming that capacitor 158 is uncharged, the signal applied to the non-inverting input of comparator 156 from the voltage dividing resistors 166, 168 establishes a voltage differential between the non-inverting and inverting comparator inputs so that the output of the comparator presents high impedance to ground. Under this condition, charging current is supplied from the B+ supply through resistors 160 and 162 to charge capacitor 158. As capacitor 158 charges, a point is reached where the voltage differential between the non-inverting and the inverting input terminals reverses polarity to cause the output of a comparator 156 to become a low impedance to ground. Capacitor 158 now discharges through resistor 162 and the output terminal of comparator 156 to ground. When capacitor 158 has discharged a certain amount, the voltage differential between the comparator inputs reverses thereby causing the output of the comparator to become a high impedance path to ground. Resistor 16 provides a certain hysteresis for the switching. In this way, the rectangular waveform 52 is developed by circuit 150 during steady state operation. By appropriate selection of circuit component values, the waveform 152 is essentially a square wave. (It will be appreciated that with capacitor 158 uncharged, the first half cycle will be longer than usual.)

A counter 170 composed of two 4-bit up-down counters 172 and 174 is connected to square wave generator 50. The two counters 172 and 174 are cascaded together to form an 8-bit up-down counter. The rectangular wave pulses appearing at line 154 are coupled through the parallel combination of a resistor 176 and a capacitor 178 to the clock inputs 180, 182 of the two counters 172 and 174. The carry-in terminal 184 of counter 172 is grounded while the carry-in terminal 186 of counter 174 is connected to the carry-out terminal 188 of counter 172. The preset enable terminals 190, 192 of the two counters 172, 174 are grounded and the positive power supply terminals 194, 196 and the negative supply terminals 198, 200 for each counter are appropriately connected with the B+ supply. The jam inputs (not shown) are arbitrarily connected to any convenient high or low point; however, it is preferred that they be connected, rather than floating. The reset terminals 202, 204 of the two counters are connected through a reset circuit composed of a resistor 206 and a capacitor 208 to the positive terminal of the B+ supply. The up/down terminals 210, 212 are connected, via input circuitry which is connected with switches 140, 142 to control the counter. The eight binary counter outputs are 234, 236, 238, 240, 242, 244, 246, 248 (in the order of increasing significance). The carry-out terminal 252 of counter 174 is connected through a diode 254 back to the clock inputs 180, 182 of the two counters and a capacitor 256 connects from the carry-out terminal of counter 174 to ground.

Circuit 34 further includes input circuitry which is operatively connected to switches 140, 142. This circuitry includes three resistors 258, 260, 262, a capacitor 264 and a diode 266. Switches 140, 142, which are connected in parallel, are of the grounding type and are adapted to supply a ground on line 268 when either of them is closed. Resistor 258 connects line 268 with the up/down terminals 210, 212 of the counter. Resistor 260 is a pull-up resistor for line 268. with this arrangement of the input circuitry a ground is applied to line 268 when either switch 140, 142 is closed, and the potential at line 268 is pulled up only when both switches are open. The signal at line 268 is used for two purposes: one, to select the direction in which counter 170 counts; and, two to select one of two frequencies for waveform 152. When the signal at line 268 is pulled up through resistor 260 (i.e., both switches 140, 142 open), counter 170 will count in the up direction, but the signal will have no effect on the frequency of waveform 152. When the signal on line 268 is ground (i.e., either or both switches closed), counter 170 will count in the down direction and the frequency of waveform 152 will be increased. The increase in frequency is caused by the ground signal at line 268 being coupled through resistor 262 and diode 266 to change the fraction of the B+ supply at the non-inverting input of comparator 156. Because of this change, capacitor 158 will charge and discharge over a steeper portion of a negative exponential curve and thereby switch the comparator output at a higher frequency. Thus, from the foregoing, it will be appreciated that counter 170 counts up at a slower rate than the rate at which it counts down.

In operation, counter 170 counts the positive-going leading edges of the positive pulses of waveform 152. The pulses are coupled via resistor 176 and capacitor 178 to both clock inputs 180, 182, of the individual counters 172, 174. Resistor 176 substantially minimizes, or eliminates entirely, any dither while capacitor 178 is basically a speed-up coupling capacitor. Resistor 176 determines logic zero or one during periods capacitor 178 is non-conducting so counter integrity is maintained and also minimizes counter power dissipation. When counter 170 contains a zero decimal count, a ground signal (representing a binary zero) is present at each binary output 235, 236, 238, 240, 244, 246, 248. Assuming that both switches 140, 142 are open, counter 170 will begin to count up, advancing one unit for every leading edge of waveform 152. Counter 170 counts up in binary fashion with a binary zero at a binary output terminal being represented by a signal level near ground and a binary one being represented by a signal level near B+. It will also be noted that the rate at which the counter counts up is at selected counting-up frequency and by way of example this may be at 0.5 hertz. When a binary one is present at each of the eight output bits of the two counters. 172, 174, a signal appears at the carry-out terminal 252 of counter 174 which is coupled back via diode 254 to both clock inputs 180, 182 of the two individual counters. This signal latches the counter so that further positive going transitions in waveform 152 are prevented from advancing the count. It will be appreciated that in the absence of such a latch circuit, were one more positive going transition of rectangular wave 152 applied to the counter, the counter output would return to zero.) With the counter latched in this manner the count is maintained at maximum value. Capacitor 256 is beneficial in attaining best operation of the circuit.

When either switch 140 or 142 closes, counter 170 will begin to count down with the count down rate exceeding the count up rate, for example, being at one hertz. When a ground is applied to line 268, the counter is released from its latched condition, and now positive-going transitions in waveform 152 will cause the counter to begin counting down one bit per every positive-going transition of waveform 152. In this way, the count will diminish until it has returned to zero. When the count returns to zero, further positive transitions in waveform 152 have no effect on the counter since the latch circuit works in both directions.

Whenever the power is initially turned on, the counter is reset to zero by the rest circuit including resistor 206 and capacitor 208 which serves to couple a reset pulse to the two individual counters 172, 174, and the rise time for the power supply must be fast enough so that a reset pulse can be coupled to the two individual counters for resetting thereof. The most significant output bit 248 is coupled via a resistor 280 with the base of transistor 24.

Accordingly, when the count equals or exceeds 128 (i.e., counter 170 half full or more), base current is supplied from the counter to cause transistor 24 to conduct and hence prevent exhaust gas recirculation. Likewise, when the count is less than 128, circuit 34 permits exhaust gas recirculation. As explained above, switches 140 and 142 control the operation of the counter. Switch 140 is an idle stop switch which senses idle and non-idle operation, being closed when the engine is in idle and open when the engine is in non-idle (i.e., part or wide open throttle). Switch 142 senses engine temperature, being closed until the engine has warmed up and then opening. Because switch 142 remains closed until the engine has warmed up, the count in counter 170 cannot advance from zero until after the engine has warmed up. Once warm up has been accomplished, the count in the counter is controlled by idle stop switch 140. When the engine is operated at non-idle, the count advances at the 0.5 hz. rate; and when the engine is at idle the count decreases at the 1.0 hz. rate. Accordingly, the instantaneous count is representative of the relative amounts of idle and non-idle engine operating over an immediately past time period of engine operation. Because of the disparity in the up and down counting rates, greater weight is given to idle operation in the present embodiment. Stated differently, the counter takes a weighted running average of idle and non-idler operation over an immediately past time period. The effect of this insofar as EGR is concerned is that after the engine has warmed up, circuit 34 prohibits exhaust gas recirculation once the vehicle is driven in a manner which exhibits substantial amount of non-idle engine operation.

Circuit 36 is provided to prevent exhaust gas recirculation as the engine is warming up. For this purpose, circuit 36 comprises a transistor stage 290 which provides drive current to the base of transistor 24 so long as the engine coolant temperature switch has opened, circuit 36 is no longer capable of supplying base current drive to transistor 24. While it is true that the idle stop switch 140 will open and close in accordance with engine operation, and hence circuit 36 will provide base current drive to transistor 24 in accordance with the operation of the idle stop switch once the engine has warmed up, circuit 30 will already be supplying base current drive to transistor 24 when the idle stop switch closes. Thus, circuit 36, insofar as it does in fact monitor idle position of the throttler once the engine has warmed up, is redundant with respect to circuit 30.

Thus there has been disclosed a novel, improved EGR control system.

What is claimed is:

1. In an internal combustion engine wherein a portion of the exhaust gas is controllably recirculated from the exhaust system through exhaust gas recirculation passage means to the air-fuel intake system, the combination comprising:
   vacuum-powered valve means for controlling the recirculation of exhaust gas through said recirculation passage means, said vacuum-powered valve means having an inlet port to which vacuum is to be supplied for operating the same;
   means for communicating said inlet port of said vacuum-powered valve means to a source of vaccum; and
   control means operatively coupled with said vacuum-powered valve means for controlling the amount of vacuum actually used to actuate said vacuum-powered valve means in controlling the recirculation of exhaust gas, said control means comprising,
   a. means responsive to the position of the engine throttle for controlling the amount of vacuum actually used to actuate said vacuum-powered valve means,
   b. means responsive to vacuum in the air-fuel intake system for controlling the amount of vacuum actually used to actuate said vacuum-powered valve means,
   c. means responsive to a pattern of past history of a selected engine operating characteristic for controlling the amount of vacuum actually used to actuate said vacuum-powered valve means, and
   d. means responsive to engine operating temperature for controlling the amount of vacuum actually used to actuate said vacuum-powered valve means.

2. The combination claimed in claim 1 wherein said control means comprises a solenoid-actuated valve through which the inlet port of said vacuum-powered valve means is connected to said source of vacuum, and circuit means for controlling the energization of said solenoid-actuated valve.

3. The combination claimed in claim 2 wherein each of said means for controlling the amount of vacuum actually used to actuate said vacuum-powered valve means is independently capable of causing said solenoid-acuated valve to interrupt the communication of said source of vacuum to said vacuum-powered valve means even though one or more other of said means for controlling the amount of vaccum actually used to actuate said vacuum-powered valve means is commanding said solenoid-actuated valve to communicate said source to said vacuum-powered valve means.

4. The combination claimed in claim 3 wherein said solenoid-actuated valve is closed when the solenoid thereof is deenergized and each of said means for controlling the amount of vacuum actually used to actuate said vacuum-powered valve means is capable of forcing the solenoid to be deenergized even though one or more other of said means for controlling the amount of vacuum actually used to actuate said vacuum-powered valve means is calling for energization of the solenoid.

5. The combination claimed in claim 3 wherein said solenoid-actuated valve is forced to block communication of said source of vaccuum to said vacuum-powered valve means so long as the throttle is operated within a limited range from its closed position.

6. The combination claimed in claim 3 wherein said solenoid-actuated valve is forced to block communication of said source of vacuum to said vacuum-powered valve means so long as vacuum in the air-fuel intake system remains above a predetermined level.

7. The combination claimed in claim 3 wherein said solenoid-actuated valve is forced to block communication of said source of vacuum to said vacuum-powered valve means so long as the engine has experienced a certain amount of non-idle operation in comparison to idle operation over a past time interval.

8. The combination claimed in claim 3 wherein said solenoid-actuated valve is forced to block communication of said source of vacuum to said vacuum-powered valve means so long as the engine temperature is below a given temperature.

9. The combination claimed in claim 1 wherein said source of vacuum comprises engine carburetor venturi vacuum.

10. In an internal combustion engine exhaust gas recirculation system wherein the amount of engine exhaust gas recirculated is controlled by an exhaust gas recirculation valve in accordance with one or more individual control inputs, the improvement wherein one of said control inputs comprises: means responsive to the pattern of past history of a selected engine operating characteristics for presently controlling the amount of exhaust gas recirculated.

11. The improvement claimed in claim 10 wherein said selected engine operating characteristic has two defined conditions and the amount of exhaust gas recirculation depends upon the duration for which the selected engine characteristic has been in the other of said two defined conditions.

12. The improvement claimed in claim 11 wherein said two defined conditions are idle and non-idler operation.

13. The improvement claimed in claim 11 wherein a weighted average of each of the two defined conditions is used to control exhaust gas recirculation.

14. The improvement claimed in claim 10 wherein the pattern of past history of the selected engine operating characteristic is limited to no more than a given past time interval.

15. The improvement claimed in claim 14 wherein said given past time interval is an immediately past time interval.

* * * * *